June 16, 1931.    P. BROSSE    1,810,200
PRINTING MACHINE FOR COLORED FILMS
Filed Nov. 28, 1929    2 Sheets-Sheet 1
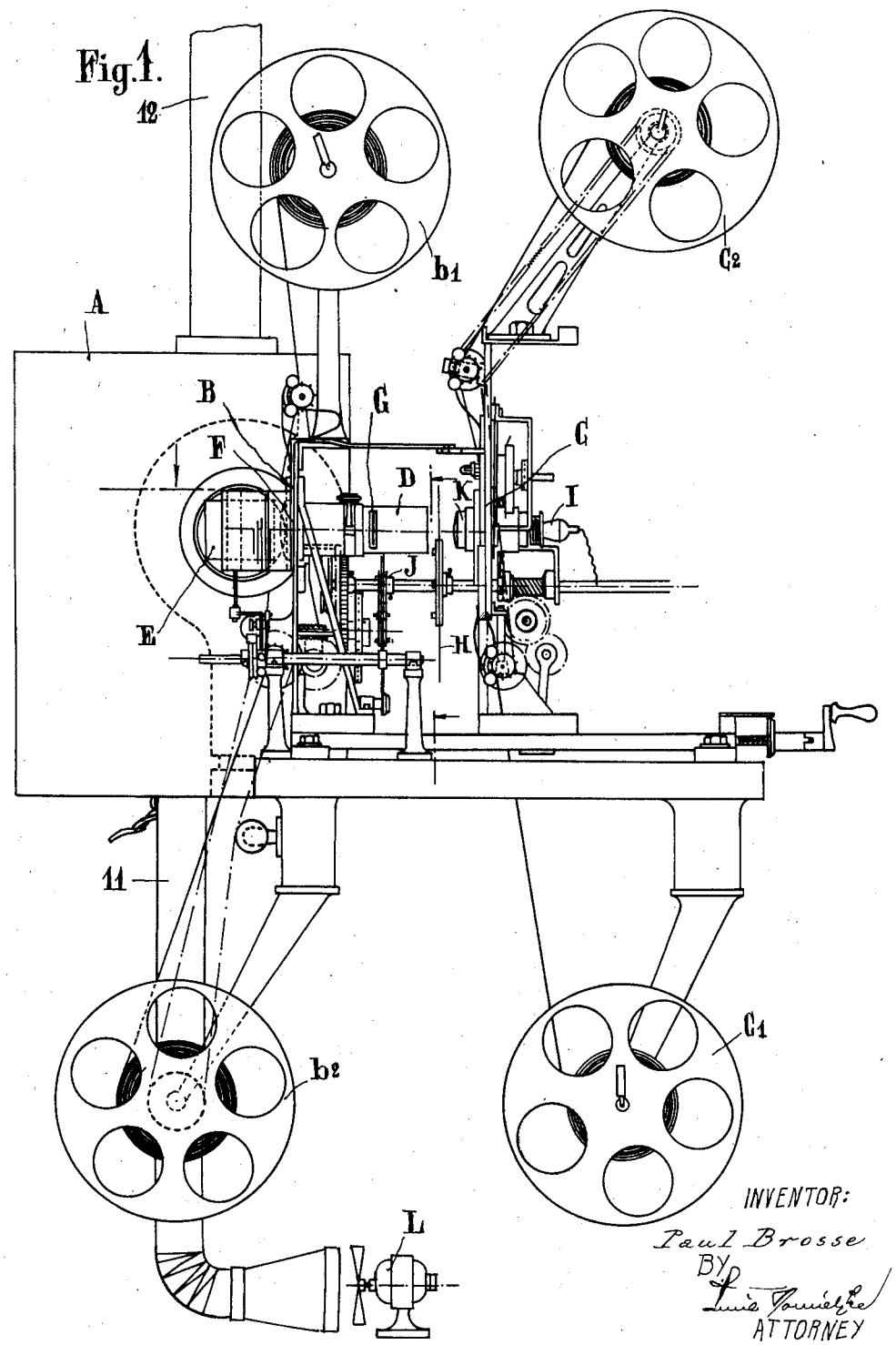

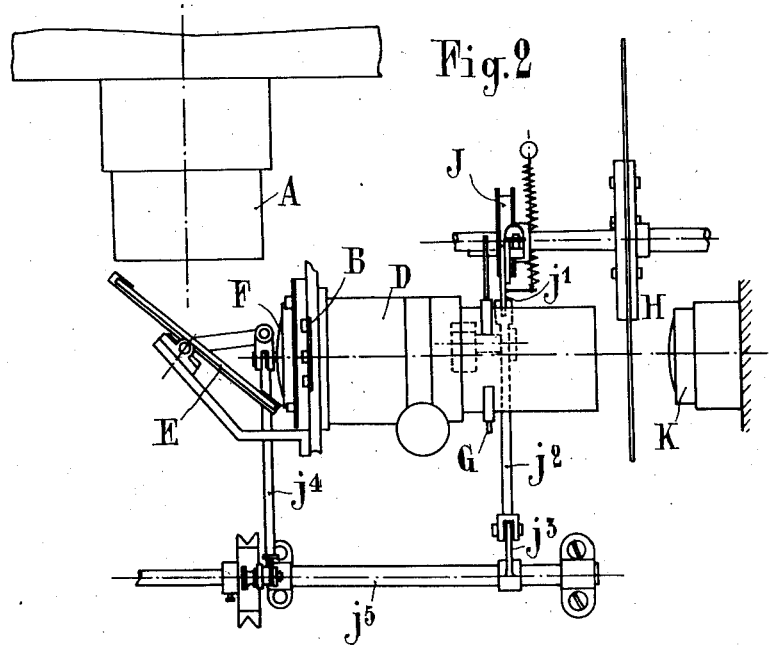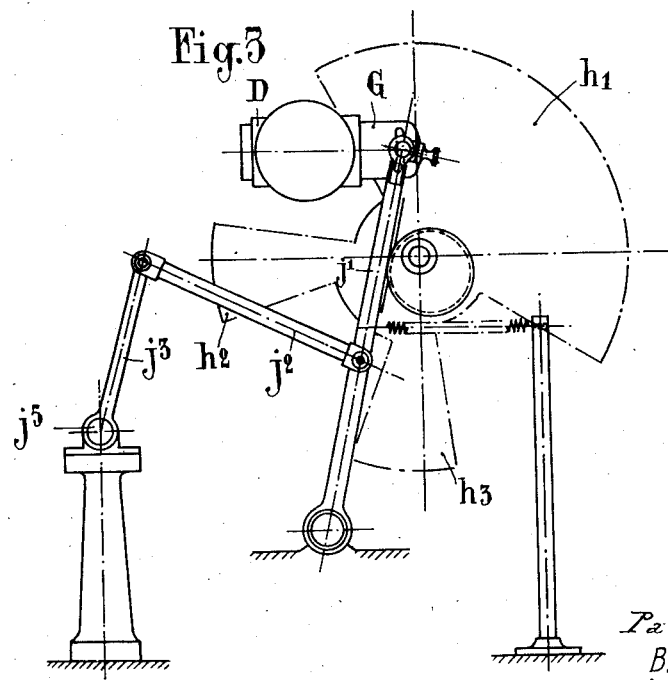

Patented June 16, 1931

1,810,200

UNITED STATES PATENT OFFICE

PAUL BROSSE, OF NEUILLY, FRANCE, ASSIGNOR, BY MESNE ASSIGNMENTS, TO KISLYN CORPORATION, OF NEW YORK, N. Y., A CORPORATION OF DELAWARE

PRINTING MACHINE FOR COLORED FILMS

Application filed November 28, 1928, Serial No. 322,504, and in France December 3, 1927.

This invention has for its object an apparatus for correctly reproducing, by projection on goffered film, colour originals which are likewise obtained on goffered film according to the now well-known Berthon process, whether the refracting system be carried by such films superficially or between two layers having different indexes.

Essentially, the apparatus comprises a conventional projection printing machine, which is provided by two passing devices whereof the mechanisms have a reversed action with respect to each other; in the one the original film is passed, say, downwards; in the other the copy is passed upwards. Therebetween is located the optical system by which the original film is projected on the virgin film by means of a light source illuminating the original film.

The particular features by which the invention is characterized are as follows:—

1.—The image of the punctual or linear light source is taken up by an oscillating mirror before the projecting beam reaches the original film;

2.—A condenser projects through the goffered film the image of the light source in the plane of the diaphragm of the projection lens;

3.—An oscillating diaphragm is arranged in the theoretical plane of the projection lens diaphragm and follows the image of the light source in the displacements thereof, while restricting the useful beam to the central portion of said image;

4.—The shutter interposed across the projecting beam and which is generally provided with a single blade intended to shut off the beam during the displacement of the images, is provided with two auxiliary blades by which the light is intercepted during exposure, when the aperture of the diaphragm passes before two given points of the pupil of the lens, which points correspond to the separation of the trichromatic screens which were used for the recording of the original film, a separation which is to be reproduced virtually on the reproduction film;

5.—An optically corrected lens arranged adjacent to the reproduction film and intended to alter the angle of incidence of the projecting beams on the reproduction film;

6.—A fogging lamp, arranged beyond the reproduction film, serves to reduce the hardness of the images at the time of the photographical inversion.

Some of these devices are justified by the necessity for radically eliminating all the diffraction phenomena resulting from a light beam passing through the refracting system of the original film, a condition which is essential to the preservation of the colours and the suppression of waterings; while others are merely intended to facilitate projection of the films reproduced as well as the quality of the images obtained.

The oscillating mirror and oscillating diaphragm pertain to the first mentioned category of such devices. The oscillating mirror causes the light to pass through the original film successively along all the incidences through which it passed at the time of picture-taking, and only along such incidences. The oscillating diaphragm has for its purpose to retain by means of each of these incidences only the central part of the projecting beam, thereby eliminating all the lateral diffraction spectra resulting from the light passing through the original film. Moreover this elimination of the lateral spectra results in the elimination of waterings, it being impossible for the image of the system to be formed in such conditions, as demonstrated by Abbe. Thus, the incidences of the colored radiations on the original film at the time of printing will not be departed from at the time of projection on the reproduction film and will not be mixed with any radiations of different incidence resulting from diffraction. When reproduced, the colors will then retain their purity.

The colours obtained by projecting the copies by means of a suitable analyzing device, though of the exact tonality, would lack brightness if, during the printing, white light were allowed to pass through the incidences which correspond to the opaque lines separating the selecting screens in the camera lens. The effect of the auxiliary blades is precisely to suppress all white light along the incidences in question.

The lens arranged adjacent to the reproduction film has a somewhat complex purpose. On the one hand it alters the angle at which the pupil of the reproduction lens is seen from the plane of the reproduction film; and on the other hand it virtually moves the plane of that pupil with respect to said film, so that it thus transposes to another scale the focal length of the camera lens which served for the printing of the original, and permits long-focused lenses to be used for projecting the prints in large rooms. The focus of that lens and the distance thereof from the reproduction film will thus be adjusted so as to best utilize the useful angle of the refracting elements of the film while complying at the same time with the best optical conditions of projection in the rooms.

As to the fogging lamp, its purpose is restricted to securing the photographic qualities of the image, namely harmony and softness, which qualities are difficult to obtain when the inversion processes are applied to trade positive emulsions, these being intended to give contrasts by direct development.

In the accompanying drawing:

Figure 1 is a general side view of the printing machine showing both parallel gates and the general arrangement of the moving members.

Figure 2 is a horizontal sectional view of the optical system taken on line 2 of Fig. 1.

Figure 3 is a vertical section on line 3—3, Fig. 1.

On all three figures the same reference letters designate the same parts or features.

A is the lamp body, which is offset laterally with respect to the optical axis of the printing machine.

B is the gate through which the original film is passed downwardly from reel $b^1$ onto reel $b^2$.

C designates the gate through which the reproduction film is passed upwardly from reel $c^1$ onto reel $c^2$.

D is the mount for the optical system by which the original film is projected upon the reproduction film.

E is the oscillating mirror receiving the light beam issuing from lamp A and directing it towards the gate B.

G is the oscillating diaphragm, the motion of which is synchronous with that of mirror E.

H indicates the shutter, which, in addition to its normal blade $h_1$, is provided with two narrow auxiliary blades $h_2$ and $h_3$.

I is the fogging lamp by which the reproduction film is illuminated from behind.

J is the eccentric keyed on the shutter shaft and by which both the oscillating diaphragm G and the oscillating mirror E are actuated through links $j_1$, $j_2$, $j_3$, $j_4$ and shaft $j_5$.

At K is shown the regulating lens for the incident beam and the reproduction pupil arranged in front of the reproduction film.

L is the ventilator for cooling both the lamp A and the original film, through the sheet metal duct 11, with discharge through tube 12.

It is to be understood that the characteristic devices hereabove referred to may be embodied in a printing machine either separately or in combination.

I claim as my invention:

1. A projection printing machine for reproducing colour prints on goffered film, comprising a source of light; an oscillating mirror to intercept the light beam before it reaches the original film; an optical system between which and the mirror the original film passes, and through which the beam is projected by said mirror upon the copying film after having first passed through the original film; an oscillating diaphragm; a lens for regulating the angle of incidence of the projecting beam upon the copying film; a shutter and shutter shaft between the regulating lens and the optical system; and means for synchronizing the movements of the shutter, diaphragm and mirror.

2. A projection printing machine for reproducing colour prints on goffered film, comprising a source of light; an oscillating mirror to intercept the light beam before it reaches the original film; an optical system between which and the mirror the original film passes, and through which the beam is projected by said mirror upon the copying film after having first passed through the original film; an oscillating disphragm; a lens for regulating the angle of incidence of the projecting beam upon the copying film; a shutter and shutter shaft between the regulating lens and the optical system; means for synchronizing the movements of the shutter, diaphragm and mirror; and a fogging lamp arranged behind the copying film to reduce the hardness of the images.

3. A projection printing machine for reproducing colour prints on goffered film, comprising a source of light; an oscillating mirror to intercept the light beam before it reaches the original film; an optical system between which and the mirror the original film passes, and through which the beam is projected by said mirror upon the copying film after having first passed through the original film; an oscillating diaphragm; a lens for regulating the angle of incidence of the projecting beam upon the copying film; a shutter and shutter shaft between the regulating lens and the optical system; and a lever system connecting the shutter shaft with the mirror and diaphragm to synchronize their movements with that of the shutter.

4. A projecting printing machine according to claim 1, in which the shutter comprises a main blade and a pair of auxiliary blades.

In testimony whereof I affix my signature.

PAUL BROSSE.